US012594500B2

(12) United States Patent (10) Patent No.: US 12,594,500 B2
Walker et al. (45) Date of Patent: Apr. 7, 2026

(54) CONTENT MODIFICATION SYSTEM AND METHOD

(71) Applicant: Sony Interactive Entertainment Inc., Tokyo (JP)

(72) Inventors: Andrew William Walker, London (GB); Sahin Serdar Kocdemir, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 268 days.

(21) Appl. No.: 18/171,751

(22) Filed: Feb. 21, 2023

(65) Prior Publication Data

US 2023/0285862 A1 Sep. 14, 2023

(30) Foreign Application Priority Data

Mar. 3, 2022 (GB) ..................................... 2202945

(51) Int. Cl.
*A63F 13/65* (2014.01)
*A63F 13/44* (2014.01)
(Continued)

(52) U.S. Cl.
CPC .............. *A63F 13/65* (2014.09); *A63F 13/44* (2014.09); *A63F 13/49* (2014.09); *A63F 13/533* (2014.09)

(58) Field of Classification Search
CPC ........ A63F 13/358; A63F 13/44; A63F 13/45; A63F 13/49; A63F 13/52; A63F 13/65; A63F 13/67; A63F 13/70
See application file for complete search history.

(56) References Cited

U.S. PATENT DOCUMENTS 4,679,789 A * 7/1987 Okada ..................... A63F 13/67
463/23
5,683,082 A * 11/1997 Takemoto ............. A63F 13/352
273/121 B
(Continued)

FOREIGN PATENT DOCUMENTS

EP 4238623 A1 9/2023
JP 2005103326 A 4/2005

OTHER PUBLICATIONS

Combined Search and Examination Report for corresponding GB Application No. 2202945.8, 6 pages, dated Sep. 5, 2022.
(Continued)

*Primary Examiner* — Omkar A Deodhar
(74) *Attorney, Agent, or Firm* — Kilpatrick Townsend & Stockton LLP

(57) ABSTRACT

A content modification system operable to modify video game content in dependence upon the time available to a user of a processing device, the system comprising an input receiving unit operable to receive inputs from one or more devices indicative of an expected duration of a function being performed by a respective device, an available time determination unit operable to determine, in dependence upon received inputs, an amount of time available to a user before the completion of the function of respective ones of the one or more devices, a content modification unit operable to modify video game content in dependence upon the determined amount of time, and a processing device operable to present the modified video game content to the user via a display associated with the processing device.

20 Claims, 4 Drawing Sheets

(51) Int. Cl.
A63F 13/49 (2014.01)
A63F 13/533 (2014.01)

(56) References Cited

U.S. PATENT DOCUMENTS

| | | |
|---|---|---|
| 2005/0255923 A1 | 11/2005 | Aoki |
| 2008/0102953 A1 | 5/2008 | Schultz |
| 2015/0143409 A1 | 5/2015 | Maughan |
| 2017/0259177 A1 | 9/2017 | Aghdale |
| 2018/0256979 A1 | 9/2018 | Kunieda |
| 2021/0146254 A1* | 5/2021 | Snodgrass ................ G06N 3/08 |
| 2021/0373676 A1* | 12/2021 | Jorasch ................. A63F 13/215 |

OTHER PUBLICATIONS

Extended European Search Report for corresponding EP Application No. 23155795.0, 8 pages, dated Jul. 3, 2023.
Examination Report for corresponding GB Application No. 2202945.8, 6 pages, dated May 23, 2024.
Examination Report issued in corresponding Application No. GB2202945.8 on Nov. 22, 2024; 5 pages.
Communication pursuant to Article 94(3) EPC, Application No. 23 155 795.0, Oct. 10, 2025, 8 pages.

\* cited by examiner

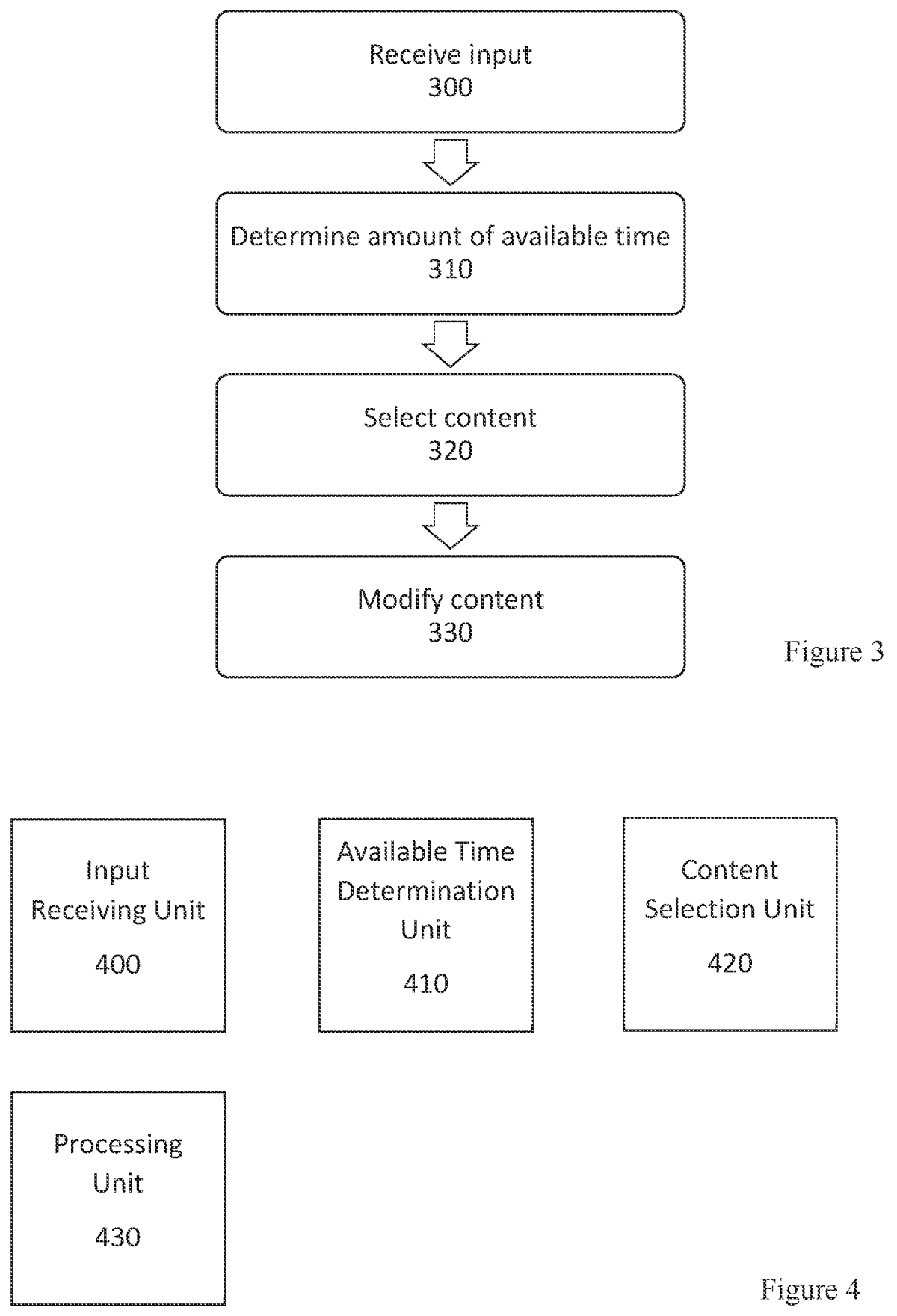

Receive input
300

Determine amount of available time
310

Select content
320

Modify content
330

Figure 3

| | | |
|---|---|---|
| Input Receiving Unit 400 | Available Time Determination Unit 410 | Content Selection Unit 420 |

Processing Unit 430

Figure 4

| Input Receiving Unit 500 | Available Time Determination Unit 510 | Content Modification Unit 520 |

| Processing Unit 530 |

Receive inputs
600

Determine amount of available time
610

Select video game content
620

Present selected video game content
630

CONTENT MODIFICATION SYSTEM AND METHOD

BACKGROUND OF THE INVENTION

Field of the Invention

This disclosure relates to a content modification system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Over time, many people have become increasingly reliant on content such as videos and games for entertainment; this may be due to the increasing availability of such content to users. For instance, improvements in technology have enabled the streaming of high-quality video to household devices while devices such as mobile phones have become increasingly powerful and as such offer an accessible platform for many people to play games and watch videos.

However, many people lead busy lives and therefore may struggle to find time for gaming or consuming media. This can lead to the consumption of media that is very short in duration, or the playing of games which have a format (such as a large number of short levels, or a low level of user engagement) that lends itself to short gaming sessions or interruption of a gaming session. This can be seen in the increasing popularity of match-3 games (short levels) and idle games (which offer progress while the user is absent from the game).

While these may not offer a user a fully satisfying experience, they may be seen as preferable to content which may be interrupted. For example, a user that is only able to watch half an episode of a TV show may have their enjoyment impacted, while a user that has to restart gameplay during an intense action segment may find their progress limited due to increased difficulty.

It is therefore considered that it would be advantageous to offer users the ability to engage with larger-scale content (such as more complex games and longer videos) in a manner that does not interfere with them from performing other tasks.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 schematically illustrates a method for modifying content for a user in dependence upon a received input;

FIG. 4 schematically illustrates a system for selecting content for a user in dependence upon a received input;

DESCRIPTION OF THE EMBODIMENTS

Figure 1:
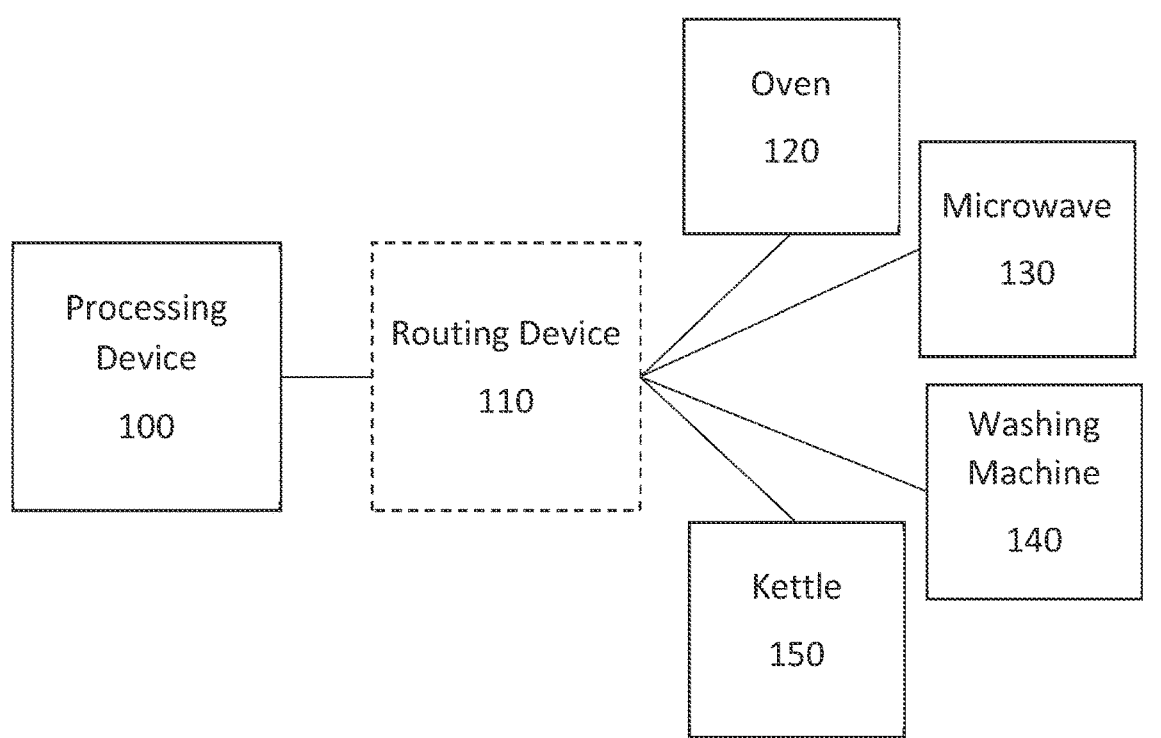
FIG. 1 schematically illustrates a system for implementing one or more embodiments of the present disclosure.

Referring now to the drawings, wherein like reference numerals designate identical or corresponding parts throughout the several views, embodiments of the present disclosure are described.

FIG. 1 schematically illustrates a system for implementing one or more embodiments of the present disclosure. This system comprises a processing device 100 (such as a games console, computer, mobile phone or set-top box) and several devices located in the user's home. The processing device 100 is operable to provide content to a user, such as video and/or games content, via an associated display which may be standalone (such as a television) or integrated (as in the case of a laptop or mobile phone). The processing device 100 is further able to obtain, directly or indirectly, information about the operation of the other devices via a network connection or the like.

The routing device 110 is an example of a local or remote bridge for enabling communication between the processing device 100 and the other devices in the network. This may be particularly useful if the devices communicate using different protocols—for instance, the processing device may operate using a Wi-Fi® connection while other devices may utilise a Bluetooth® connection. The routing device 110 can act as a bridge between these, being able to receive and transmit information using a number of different protocols as appropriate for the devices. The routing device 110 may also perform an interpretive function, in which information received from the other devices is processed to determine further information about a function being performed by a corresponding device. In some embodiments this device 110 may be omitted if the devices are able to communicate with one another directly.

In some embodiments, the system may use a mobile phone or a tablet (as examples of user-operated devices) to act as a routing device 110 or to act as a further device between the routing device 110 and the processing device 100. In the latter case, this may be advantageous in that this can reduce the burden on the processing device 100 in handling the communication information—the phone may be configured to receive information, process it, and generate an output to the processing device 100 that is suitable for use without further processing (or at least no significant further processing) prior to use in a method as described below.

The other devices may include any device which is operable by a user without their supervision (or at least without continuous supervision). Examples shown in FIG. 1 include an oven 120, a microwave 130, a washing machine 140, and a kettle 150; however, other devices may also be considered. These are examples of devices which a user may set up and then leave during their operation—for instance, placing food in an oven and then leaving it to cook. During this operation, it is considered that a user may wish to play a game or watch a video. Rather than limit the user to short content, or no content at all, in view of the available time to the user before the task being performed by the device is completed, embodiments of the present disclosure seek to select, generate, and/or modify content so as to be compatible with the time constraints imposed by the use of these devices.

In some embodiments, an example of an other device is that of a car or other vehicle; these may be operable without a user's supervision in the case that the car is self-driving, the user is a passenger, or the user is not present in the car. In such cases, the time constraints are imposed by a journey time—either the user reaching their destination (or reaching a segment of the journey requiring their supervision), or the driver arriving at the location of the user (at which time the user would be expected to terminate their gameplay session). Information about a journey time may be communicated by a car directly (based upon a built in satellite navigation system, for example), or by a mobile phone or other electronic device which is able to determine an expected journey time. This information may be communicated via the internet, for example, or any other method of transferring data such as SMS updates.

It is considered that these devices are operable to output information about their operation to the routing device 110 (or any other intermediate device) and/or the processing device 100. In some cases the output by the device may be an indication of the function being performed (for instance, a kettle could output information indicating that the user has selected 'green tea' as the function) and this output can be interpreted (for instance, using a look-up table) by the routing device 110 (or another device) to determine an associated time before completion of the function. Alternatively, or in addition, the devices may output information defining the expected (or specified) duration of a function. For instance, if an oven has been set to a thirty-minute timer then this information can be output; similarly, the duration of a selected wash cycle by the washing machine could be output.

Figure 2:
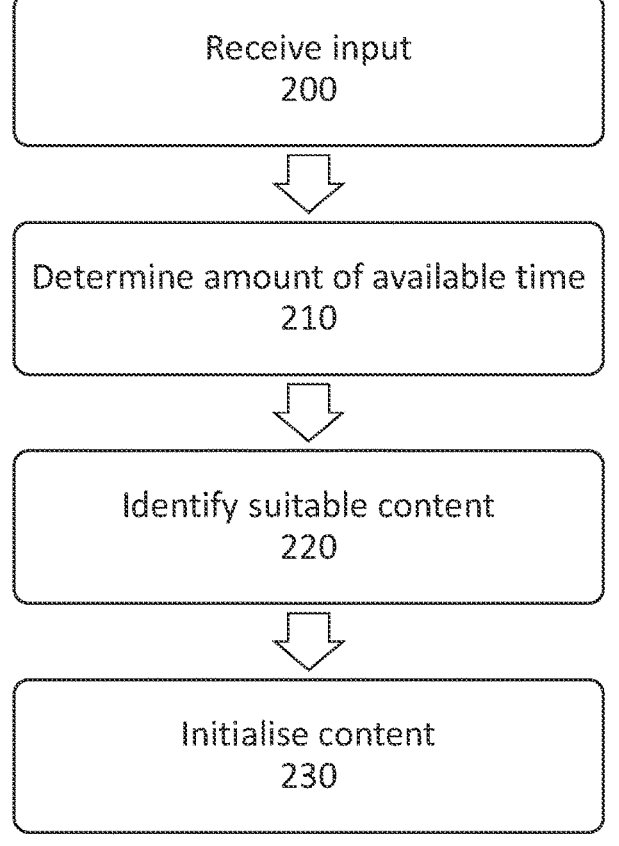
FIG. 2 schematically illustrates a method for selecting content for a user in dependence upon a received input.

FIG. 2 schematically illustrates a method for selecting content for a user in dependence upon a received input. This method enables the selection of video content or a video game (or a portion of either) which is able to be consumed by the user without significant interruption due to the operation of other devices such as those discussed with respect to FIG. 1.

A step 200 comprises receiving an input from an associated device that is indicative of the operation of that device. This input may be received directly from the device, or via an intermediate device that may be operable to perform processing on that input. This input may include timing information for a function being performed by the other device, and/or an indication of the function being performed. This timing information may include a start time, end time, and/or duration of the function.

A step 210 comprises determining an amount of time available to the user in dependence upon the received input. In some cases this simply comprises the reading of the amount of time remaining for a function being performed by one of the other devices or an estimated finish time for that function, while in others processing may need to be performed to determine an expected finish time for the function in order to determine an amount of time available.

In addition to the determination of the amount of time available, this step may also include a determination of the amount of leeway in the determined amount of time; this is effectively a measure of how important it is that the user attends to the event associated with the input. For example, a user may wish to attend to an oven when their food is ready quite quickly (for instance, a tolerance of two or three minutes) but may be happy to leave washing in the washing machine for a much longer time before attending to it (for instance, a tolerance of twenty or thirty minutes).

Further to either or both of these determinations, a determination may be made of whether it would be expected that the user will simply pause the game to take a short break, or whether they will quit the game entirely. For example, if the time available is constrained by the use of the oven then it may be considered that a user would be likely to quit a game in order to eat. Similarly, if the time available is constrained by the use of a kettle then it may be considered that a user would be likely only to pause a game. This determination may be performed based upon a user profile and/or history in respect of their behaviour with respect to particular device functions, for example.

In some embodiments, an exact determination of the time available may not be possible—for instance, if a duration of a function is known but not a start or end time. In such a case, an estimation of the available time may be generated based upon a guess or estimate of the time elapsed since the function was started. This can be derived from previous experience; for instance, a determination of the time for a user to travel from the kitchen to a games console after putting the kettle on can be based upon previous occasions when the kettle has been operated as the time between starting gameplay and getting up to tend to the kettle may be recorded. Alternatively, a predetermined amount of time can be selected as a time since the start of the function; this may be determined per user based on previous use, defined by a user input, or selected for a given activity independent of the user. For instance, this predetermined amount of time could be used to generate a start time for the function by subtracting that amount of time from the time at which the user began using a games console.

A step 220 comprises identifying content suitable for being provided to a user in dependence upon amount of available time. Suitable content may be any content which can be expected to be completed or progressed between break points (such as checkpoints or save areas), or which is forecast to have a low-intensity portion at the expiration of the available time. In the case that the content is video, the duration of the video or the location of suitable break points within the content (such as the location of advertisement breaks, or parts of the content identified as being low intensity) may be considered. These may be determined based upon an analysis of the content, or associated metadata which identifies such characteristics.

Here, intensity refers to the amount of 'action' that occurs in a given period—this can be defined in any suitable manner for a given content, and can be determined in a number of ways. For example, in some games the intensity may be determined based (at least in part) upon the number of enemies or their total strength, the user's remaining hit points, a travelling speed, or any other metric. A low intensity game portion may be one in which there are few (if any) enemies present, for instance, while a high intensity game portion may be one in which there are a larger number of enemies present.

A step 230 comprises initialising one or more contents identified as being suitable in step 220, such as beginning (or resuming) playback of a video or launching a game. This may be performed automatically, or in response to a user selection of one or more of the identified contents (or at least a selection of a type of content, after which an automatic launch of a particular content can be performed). An automatic selection may be made in dependence upon an indication of user preferences, for instance, saved game states, and/or one or more other criteria. Examples of such criteria for selecting a game may include: how recently the user has played the associated game; the total time that the user has played the associated game; how close to the end of the game the user is; whether the user is likely to obtain a reward in the available time; whether the user is expected to pause the game or quit; and whether the game requires data to be downloaded before starting.

Such a method therefore enables a selection of content in accordance with the amount of time available to a user, allowing them to experience content which enables greater engagement despite the time constraints upon the user. This advantage is able to be provided without a significant input burden upon a user, as information about available time is obtained from other devices rather than from the user as is the case in some earlier arrangements.

The identification step 220 may comprise an analysis of content that may be provided to a user, such as installed (or otherwise accessible) games or available video streams; alternatively, such information may be available from pre-generated metadata or other associated data for that content which indicates one or more relevant characteristics (such as the location of break points or content duration). This analysis may be performed so as to identify checkpoints, save game opportunities, and areas of low/high intensity gameplay, for example, that are available within the content. This may be on the basis of the entire content, or on the basis of the content insofar as it can be experienced by the user in the identified available time. For instance, rather than identifying the location of all checkpoints in a game, only the location of checkpoints that can be encountered by the user within the available time may be identified.

The current game state for a videogame can be obtained from a save file created by that game, which is typically available on a local storage of the videogame apparatus, such as HDD 37. However, it is also commonplace for games associated with user accounts to have safe files mirrored to a remote server (so-called 'cloud saves'). Similarly, for streaming services where the games are run remotely and streamed to a client device, the game save may reside on the remote server. Hence the current game state for a given game may be available on a local videogame apparatus and/or a remote server. It will be appreciated that as long as the game state can be accessed, the precise location is not essential. Where a game has created multiple save files, then the most recent file, or a file identified as a 'current' or 'continue from here' save file (for example, a file created when exiting the game) may be used as the source for the current game state.

Typically, the game state of a game will identify for example some or all of: what level the user is currently on within the game, what save point the game was saved at (if fixed save points are used), the players in-game location, what levels are currently available to the user, what quests/challenges are currently available to the user, and the like.

This information may be extracted from a save file using information provided by the games developer or publisher (for example relating to the location of variables or descriptors for levels, open quests, save points and the like), or may be extracted from a data structure included within the save file that is specifically provided for the purposes of the present technique.

The analysis of the content may further comprise obtaining timing data for elapsed times between validated pairs of game states that includes an accessed current game state and a candidate next game state, the candidate game state being a game state which is considered suitable for a user to take a break (such as a checkpoint, or a period of low intensity within the game).

Examples of elapsed times between two game states include the time between two fixed save points, the time to begin and complete a quest, the time to engage and defeat a boss, the time to play a round of a multiplayer game in a particular play mode, the time to level up a character from their current level, the time to reach a key point within the game environment from their current position, and the like.

The timing data for these elapsed times may be obtained from a database, look up table or similar held locally and/or at a remote server. Hence for a given current state, one or more candidate next game states may be associated with it, together with a respective elapsed time. Only states that are associated in this way can be considered a validated pair of game states, for which timing data is obtainable. Hence a validated pair of game states may be considered to be a pair of game states with which timing data has been associated, typically in the form of progression from a first game state to a second game state.

It will be appreciated that a current state may comprise several different game state components that may separately be associated with respective candidate game state components. Hence for example in the role-playing game, the user may have unlocked several quests. Consequently, the time to complete each of these quests may be obtainable. Similarly, in a racing game where completion of the preceding race track unlocks the next race track, then the time to complete each unlocked racetrack, including the next race track, may be obtainable.

In some cases, the timing data for elapsed times between a validated pair of game states is provided by a provider of the respective game, such as for example the developer or publisher of the game. This data may be based upon the provider's experience or expectations, or may be empirically derived using one or more of the techniques described herein below.

Alternatively, or in addition, the timing data for elapsed times between a validated pair of game states is based on timing data collected from a subset of other players. Hence for example data may be obtained from play-testers used by the developer or publisher of the game, and/or may be obtained from conventional players of the game, who for example have progressed from the first player's current state to the candidate next state within a game.

The elapsed time taken for this subset of players to progress from one state to another is of course likely to vary considerably. To a first approximation, the timing data for the candidate next state may be the average of the elapsed times for this subset of other players.

However, given that the player is searching for activities due to a time constraint, it can be assumed that they are likely to play the game in a focused, goal driven and relatively rapid manner. As a result, to a second approximation the subset of other players comprises a subset of a predetermined percentage of other players having the fastest elapsed times. This serves to bias the average towards a faster gaming style, and may therefore bring the achievement of candidate next game states to within the target time.

It also serves to avoid statistical outliers such as players who begin a game and then disengage for long periods, who might otherwise significantly skew the averages.

The predetermined percentage may be determined empirically to provide a bias that results in a realistic elapsed time. Hence for example if the average time for the fastest 50% of players is less than or equal to the target time, then this may provide an enjoyable and achievable activity for the first player, whereas if only the average time for the fastest 5% of players is less than or equal to the target time, then this is likely to be an unachievable activity for the first player, and may result in frustration. Consequently, typical values for the predetermined percentage of fastest other players may be 25%, 33%, 50%, 66%, or 75%, with higher percentages being more inclusive of players with less ability, but reducing the number of candidate next game states that will be less than or equal to the target time. Optionally the first player could specify an upper degree of difficulty that could be used to select a corresponding predetermined percentage, with a higher degree of difficulty corresponding to a smaller value for the predetermined percentage.

Alternatively, or in addition, the subset of other players may comprise a subset of other players having an elapsed time up to a predetermined multiple of the target time. Notably, unlike the previously described subset where the elapsed time is derived from the average times of other players, in this case the elapsed time is ultimately derived from the target time, because this is used to select the subset of other players.

Hence in this case the subset of players is those who achieved the candidate next state within a period of time similar to the first player's target time. The predetermined multiple is typically one of 1.0×, 1.1×, . . . 1.9×, 2.0×. Whilst a higher multiple may be considered, clearly the average of such a subset of players is more likely to be greater than the target time, making greater multiples unappealing. A typical multiple value is likely to be between 1.5× and 2.0×, typically resulting in an average close to the target time.

However, it will be appreciated that this subset of players is selected based on the first player's target time, rather than because they are necessarily representative of elapsed times for achieving the candidate next state. Hence optionally the subset is not included if it represents less than a threshold percentage of all players having an elapsed time. This echoes the previous technique, where it was noted that for example if only 5% of other players achieve a given time, then the activity is unlikely to be achievable by the first player. Hence by requiring that a threshold percentage of all players have achieved the candidate next game state within the predetermined multiple of the target time, this provides a corresponding percentage chance that the first player can similarly achieve candidate next game state. For example, a threshold percentage may be 25%, 33%, 50%, 66%, or 75%, with higher percentages being more inclusive of players with less ability, but reducing the number of candidate next game states that will qualify.

The above discussion provides an example of a method by which the time to complete a portion of a game may be estimated, which can assist with determining which games (or portions of games) available to a user would satisfy the requirement imposed by the time available to a user before interruption.

FIG. 3 schematically illustrates a method for modifying content for a user in dependence upon a received input. This modification may include tailoring content to a user's available time, for example, or providing in-game notifications to a user based upon a game state (or other notifications based upon the state of other content, in the case that the content is not a game).

A step 300 comprises receiving an input from an associated device that is indicative of the operation of that device. This input may be received directly from the device, or via an intermediate device that may be operable to perform processing on that input. This input may include timing information for a function being performed by the other device, and/or an indication of the function being performed. This timing information may include a start time, end time, and/or duration of the function.

A step 310 comprises determining an amount of time available to the user in dependence upon the received input. In some cases this simply comprises the reading of the amount of time remaining for a function being performed by one of the other devices or an estimated finish time for that function, while in others processing may need to be performed to determine an expected finish time for the function in order to determine an amount of time available.

In addition to the determination of the amount of time available, this step may also include a determination of the amount of leeway in the determined amount of time; this is effectively a measure of how important it is that the user attends to the event associated with the input. For example, a user may wish to attend to an oven when their food is ready quite quickly (for instance, a tolerance of two or three minutes) but may be happy to leave washing in the washing machine for a much longer time before attending to it (for instance, a tolerance of twenty or thirty minutes).

Further to either or both of these determinations, a determination may be made of whether it would be expected that the user will simply pause the game to take a short break, or whether they will quit the game entirely. For example, if the time available is constrained by the use of the oven then it may be considered that a user would be likely to quit a game in order to eat. Similarly, if the time available is constrained by the use of a kettle then it may be considered that a user would be likely only to pause a game. This determination may be performed based upon a user profile and/or history in respect of their behaviour with respect to particular device functions, for example. This determination may be useful to determine how a break point should be implemented—for instance, it may be preferable to suggest a role-playing game to a user rather than a sports game if they would be likely to quit, as a user would likely not want to quit at half-time in a game (but may be happier to pause).

In some embodiments, an exact determination of the time available may not be possible—for instance, if a duration of a function is known but not a start or end time. In such a case, an estimation of the available time may be generated based upon a guess or estimate of the time elapsed since the function was started. This can be derived from previous experience; for instance, a determination of the time for a user to travel from the kitchen to a games console after putting the kettle on can be based upon previous occasions when the kettle has been operated as the time between starting gameplay and getting up to tend to the kettle may be recorded. Alternatively, a predetermined amount of time can be selected as a time since the start of the function; this may be determined per user based on previous use, defined by a user input, or selected for a given activity independent of the user. For instance, this predetermined amount of time could be used to generate a start time for the function by subtracting that amount of time from the time at which the user began using a games console.

An optional step 320 comprises selecting content for a user in dependence upon the available time; in other embodiments, the user is able to select the content freely or the most-recently launched game or next episode of the most-recently watched content may be selected. An automated selection may be performed in some embodiments based upon how easily modified a game is, for example, and/or how well it is expected that a user would be able to make use of their available time. Examples of these are discussed in more detail below.

The ease of modification of a game may be determined based upon any suitable criteria; in some cases, the ease may be defined by metadata associated with the game (or other data). For instance, a single player game may be considered easier to modify than a multiplayer game as this may generally lend itself more easily to modification due to not having to consider the impact of the modifications on other players. Similarly, game genres may be considered—a sports game may be considered less suitable than a role-playing game as the experience is more constrained in the sports game. For instance, a football game would not be well-received if the game were terminated at seventy minutes instead of the regulation ninety.

The ability of a user to make the most of their available time refers to the difference in time between a break point at which the user is expected to stop engaging and the amount of available time. For instance, if the user has twenty minutes available then it would be preferable if the suggested content lasted for eighteen minutes rather than ten (or had a break point at eighteen minutes rather than ten as the only break points before the twenty-minute mark) as this represents a more efficient use of the time available. In those cases in which a tolerance on the available time can be utilised, content may be suggested which most closely aligns a break point to the available time without considering whether the available time is exceeded.

A step 330 comprises modifying the content, which may include any modification of the user's experience of the content, in dependence upon the available time to the user. This may be performed in any suitable fashion—for instance, a games console may provide an input to a game indicating a desired gameplay experience (such as providing breaks at a particular time, optionally with a particular tolerance level on that time) and a game may tailor the content. Alternatively, the modification may be implemented at a system level with no interaction of the game—for instance, a games console may obtain information about the gameplay and generate a system level notification as a modification of the content.

In some embodiments, the modification is performed with consideration of the variance in the expected time for the user to complete the content—this may be particularly important for content which is not as rigid with its break points (such as sports games with a pre-defined duration). This may be implemented in the form of a buffer amount of time, for instance by determining modifications with the intention of making use of ninety percent (or any other suitable value based upon the degree of variance, tolerance on the available time, and/or the user's willingness to exceed the available time) of the available time so that the user is unlikely to exceed that time. Similarly, the modifications may be determined to as to include a period of low intensity which spans a period of time that corresponds to a percentage of that variance. For example, if a variance of two minutes either side of the estimated time is determined for a user to reach a break point, then the content may be modified such that for one minute either side of the break point would be a suitable break point (such as having a low intensity of gameplay).

A first example of such a method being implemented is that of tailoring a user's gameplay such that it will have a break point that coincides with the end of the user's available time (or at least occurs within a threshold amount of time of the end of available time). For instance, a user may select (or be presented with) a racing game to play. In such a case, the method may be operable (at step 330) to select or generate a race that would be expected to have a duration that falls within (or is roughly equal to) the available time. This may include selecting or generating a track having a particular expected lap time, determining a number of laps, and/or placing other conditions (such as a vehicle acceleration/top speed or the like) on the race such that the expected lap time multiplied by the number of laps leads to an expected race time that is suitable in view of the available time.

Of course, such an approach may be taken in any game genre—for instance, a score (or other) threshold may be defined for a level based upon a user's average performance (score per unit time, for instance) so as to provide an experience to the user that ends (or has a break) in a timely manner. For example, a sports game may have a half length selected to fit within the available time (to enable a full game or multiple games to be played), or a 'first to X goals' condition may be applied. Further constraints may also be applied, such as preventing games from going to extra time and limiting the amount of injury time or the like, so as to cause the gameplay to have a more consistent and predictable expected duration. In some embodiments one or more elements may be relocated or modified to assist with increasing or decreasing the time before a break—for instance, making an object easier or harder to find (size or colour changes, for example) can vary a quest length, or making goalposts bigger can lead to a faster end of the game when in a sudden death mode.

These are examples of generating (or selecting) content with an expected end time, with the expected end time being determined based upon any suitable characteristics. These characteristics may include any game state indicators (such as number of laps), as well as any user characteristics such as indicators of past performance.

A second example of such a method being implemented is that of tailoring a user's gameplay such that the game reduces in intensity at the end of the available time, or around that time (such as within a threshold amount of time of the end of the available time). This may be performed in a similar manner to the first example, albeit this second example is intended to illustrate a more dynamic approach to the time management.

When approaching the end of the available time, embodiments according to the second example are operable to modify the user's gameplay so as to reduce the intensity of the gameplay at an appropriate time. This is performed in advance of the end of the available time, although the amount of time in advance of this may be selected freely. Modifications can include any changes that lead to the end of the available time coinciding with a break in the content or a period of low intensity—reducing or stopping the spawning of enemies is an example of the latter, as is the transportation of a user to a new area within a game (such as a save/recharge area, or simply a new part of a map with fewer enemies).

For instance, in some cases a 'score attack' level may be terminated at the end of the expiry time—this can be implemented very close (such as a number seconds, such as ten seconds or fewer, remaining of the available time). Similarly, with a few minutes remaining a 'last goal wins' rule or the like may be implemented in a sports game—this can be implemented less closely to the end of the available time, such as a number of minutes, such as five minutes or fewer, remaining of the available time. A further example is that of selecting or generating a next stage while playing a game, or a portion of the map (such as a cave that can be explored) to not exceed the available time—this can be performed with any suitable timing, but may be most effective in the range of five to twenty minutes in advance of the available time (for instance). These timings and modifications are of course entirely exemplary, and the skilled person would be capable of implementing a method in which an appropriate time and modification can be utilised.

In a similar vein, modifications according to this example can also comprise an increasing of the intensity of a game where appropriate. For instance, if there is a lull in the intensity with a few minutes remaining of the user's available time then the intensity could be increased (for instance, by increasing the number of enemies) to enable the user to make the most of the final few minutes. Nearer to the end of the available time, the intensity could be lowered again.

A third example of such a method being implemented is that of controlling the content to display a notification to the user which indicates that they will not be able (or at least not likely) to reach the next break point before the end of the available time. This can be treated as an indication to the user that their current game state (or point in a video) is likely to be the last break point before the available time has elapsed. In some embodiments, a likelihood may be calculated and displayed that indicates to the user how likely they are to reach the next break point in the available time; this may be estimated based upon previous user performance and/or information about other users' progression, for instance.

In addition to this information, the user may be provided with an indication of the remaining available time to better inform their decision of whether to proceed. In some embodiments, the display of this notification may be accompanied by an auto-save of a game, and (if desired) an automatic termination of the content. This can be particularly useful for those who may have a hard time quitting a game, or when it is particularly important that the user supervise the other device (such as checking food is not burning).

The generation of such notifications requires information to be obtained about the content itself, this can be obtained via an analysis of the content (such as one in line with the above discussion), or via metadata or other data relating to the content. For instance, a user's performance may be tracked in a game to determine the average time between break points (such as save points or check points). Similarly, a game may have associated metadata that indicates timing information to assist with such a process. In some embodiments, it is sufficient to have information about game settings or a video duration rather than needing detailed information—for instance, if a user has a pre-defined half length in a sports game then this is sufficient information to determine whether the next game would finish before the available time expires.

While described above as separate examples, it is considered that an implementation of a method according to the present disclosure may also, or instead, use a modification that incorporates elements of any two or three of those examples (or indeed, other modifications). This may be particularly useful in a case in which a user progresses within a game more quickly or slowly than anticipated—this could be due to poor (or exceptional) performance, for instance, or due to pausing the game unexpectedly. This means that an initial generation of a stage to have a particular duration may not be fully successful, as it would overrun or fall short, and as such further modification may be required. Similarly, the notification example can be combined freely with the other examples as this represents an appropriate way to indicate to a user that the available time has almost fully elapsed, particularly if it is not clear to the user from the game state that this is the case (for instance, in the middle of a game stage).

FIG. 4 schematically illustrates a system for selecting content for a user in dependence upon a received input. This system comprises an input receiving unit 400, an available time determination unit 410, a content selection unit 420, and a processing unit 430.

In some embodiments, the units 400, 410, 420, and 430 may be implemented as a part of a processing device such as the device 100 of FIG. 1. Alternatively, one or more of these units may be implemented at a different device such as a routing device which is operable to communicate with the processing device, and/or a cloud processing system in the case that the game is executed remotely to the processing device.

The input receiving unit 400 is operable to receive inputs from one or more devices indicative of an expected duration of a function being performed by a respective device. As discussed with reference to FIG. 1, these the other devices may include one or more household appliances and/or other Internet of Things, IoT, devices, where household appliances include ovens, microwaves, kettles, washing machines, and tumble driers.

In some embodiments, the input receiving device 400 is operable to receive information from a routing device (such as the routing device 110 of FIG. 1) that is configured to act as an intermediate device between at least one of the one or more devices and the processing device. The routing device may, in some embodiments, be operable to process information received from devices to identify timing and/or function information—for instance, this processing may include receiving information about a function being performed by a device and using a look-up table or the like to determine a duration of that function.

The available time determination unit 410 is operable to determine, in dependence upon received inputs, an amount of time available to a user before the completion of the function of respective ones of the one or more devices. In some cases, this may simply comprise the reading of an estimated end time of a function in received information and determining the available time based upon this and the current time. Similarly, the received information may comprise a start time of the function and an estimated duration that can be used to determine the available time. In some cases, the available time determination unit 410 may be operable to determine a tolerance or threshold deviation from the available time that is allowed (for example, based upon the function being performed and/or the device performing the function)—for instance, to account for how long a user would be happy to leave the device unattended once the function has been determined to be completed.

In some embodiments, the available time determination unit 410 is operable to determine whether the user is expected to pause the game or exit the game; this determination may be made based upon user preferences, usage history (for instance, if the user usually plays for a duration that is greater than the available time, it may be inferred that they will likely continue playing after a break and so only pause the game), the function that is being performed by a respective device, and/or the identity of the device communicating the function information.

The content selection unit 420 is operable to select video game content in dependence upon the determined amount of time (that is, the amount of time determined to be available to the user). The selected video game content may be any content which can be expected to be completed or progressed between break points (such as checkpoints or save areas), or which is forecast to have a low-intensity portion at the expiration of the available time. Information about break points or intensity may be determined based upon an analysis of the content (such as that described above), or upon data obtained about the game such as data provided by a game developer or crowd-sourced information from the playthroughs of a cohort of individual users which indicates break points and areas of low intensity gameplay.

The processing unit 430 is operable to present the selected video game content to the user via a display associated with the processing device; this may be a processing device such as the device 100 discussed with reference to FIG. 1. This may be implemented by a games console and television, for instance, or a device with an integrated display such as a mobile phone, tablet computer, or laptop. Presenting the selected content may include a launching of the selected game, or this may be performed by a user of the processing unit 430.

Further features of the selection are discussed with reference to FIG. 2 of the specification; these may be considered to be compatible with the arrangement discussed with respect to FIG. 4 and as such the features of these discussions may be combined freely.

The arrangement of FIG. 4 is an example of a processor (for example, a GPU and/or CPU located in a games console or any other computing device) that is operable to select content for a user in dependence upon a received input, and in particular is operable to: receive inputs from one or more devices indicative of an expected duration of a function being performed by a respective device; determine, in dependence upon received inputs, an amount of time available to a user before the completion of the function of respective ones of the one or more devices; select video game content in dependence upon the determined amount of time; and present the selected video game content to the user via a display associated with the processing device.

Figures 5, 6:
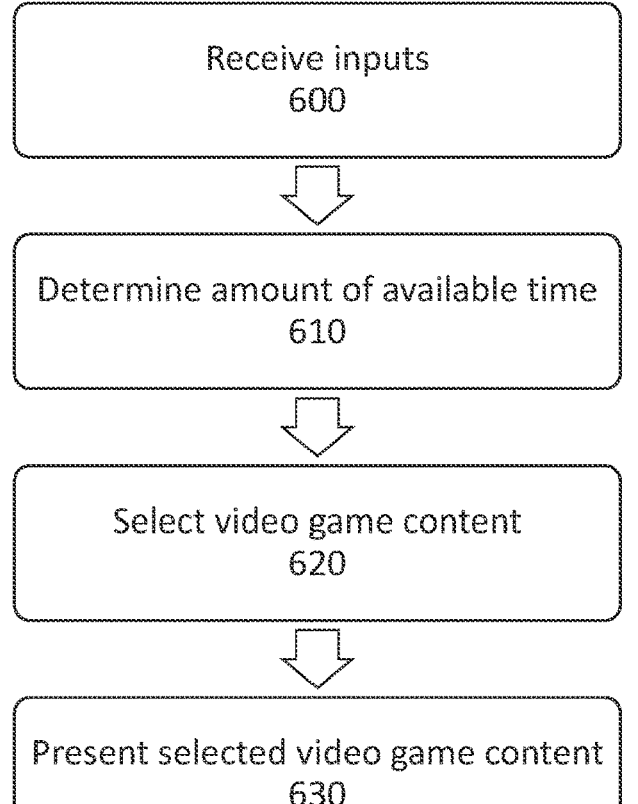
FIG. 5 schematically illustrates a system for modifying content for a user in dependence upon a received input.
FIG. 6 schematically illustrates a method for selecting content for a user in dependence upon a received input.

FIG. 5 schematically illustrates a system for modifying content for a user in dependence upon a received input. In particular, this Figure shows a content modification system operable to modify video game content in dependence upon the time available to a user of a processing device. This system comprises an input receiving unit 500, an available time determination unit 510, a content modification unit 520, and a processing unit 530.

In some embodiments, the units 500, 510, 520, and 530 may be implemented as a part of a processing device such as the device 100 of FIG. 1. Alternatively, one or more of these units may be implemented at a different device such as a routing device which is operable to communicate with the processing device, and/or a cloud processing system in the case that the game is executed remotely to the processing device.

The input receiving unit 500 is operable to receive inputs from one or more devices indicative of an expected duration of a function being performed by a respective device. As discussed with reference to FIG. 1, these the other devices may include one or more household appliances and/or other Internet of Things, IoT, devices, where household appliances include ovens, microwaves, kettles, washing machines, and tumble driers.

In some embodiments, the input receiving device 500 is operable to receive information from a routing device (such as the routing device 110 of FIG. 1) that is configured to act as an intermediate device between at least one of the one or more devices and the processing device. The routing device may, in some embodiments, be operable to process information received from devices to identify timing and/or function information—for instance, this processing may include receiving information about a function being performed by a device and using a look-up table or the like to determine a duration of that function.

The available time determination unit 510 is operable to determine, in dependence upon received inputs, an amount of time available to a user before the completion of the function of respective ones of the one or more devices. In some cases, this may simply comprise the reading of an estimated end time of a function in received information and determining the available time based upon this and the current time. Similarly, the received information may comprise a start time of the function and an estimated duration that can be used to determine the available time. In some cases, the available time determination unit 510 may be operable to determine a tolerance or threshold deviation from the available time that is allowed (for example, based upon the function being performed and/or the device performing the function)—for instance, to account for how long a user would be happy to leave the device unattended once the function has been determined to be completed.

In some embodiments, the available time determination unit 510 is operable to determine whether the user is expected to pause the game or exit the game; this determination may be made based upon user preferences, usage history (for instance, if the user usually plays for a duration that is greater than the available time, it may be inferred that they will likely continue playing after a break and so only pause the game), the function that is being performed by a respective device, and/or the identity of the device communicating the function information.

The content modification unit 520 is operable to modify video game content in dependence upon the determined amount of time. In some embodiments, the content modification unit 520 is operable to select one or more parameters for initiating a segment of a game. Alternatively, or in addition, the content modification unit 520 may be operable to modify one or more parameters of video game content during gameplay by the user.

These modifications are performed so as to achieve a target duration of the gameplay experience of the user in dependence upon the time available to the user. In some embodiments, this target duration is determined as a duration that causes a suitable place for the user to take a break to coincide with the target duration—it is not required that the gameplay be terminated at this time. In other words, the target duration may be considered to be achieved if the gameplay provides a suitable stopping point for a user at a time corresponding to the target duration—independent of whether the user stops playing at that time. As discussed above, a 'suitable stopping point' is one in which there is a save point, checkpoint, low-difficulty gameplay, and/or low-intensity gameplay, for example.

In the case that the content modification unit 520 is operable to select one or more parameters for initiating a segment of a game, this may include the setting of a game length or an expected game length by performing an appropriate parameter selection. For instance, defining a half length in a sports game, a target score to be attained, or a number of laps in a racing game may be considered examples of this feature. The segment may be a game level, a sports match, or a race, for example, or any other portion of gameplay such as a specific task or goal being set.

In the case that the content modification unit 520 is operable to modify one or more parameters of video game content during gameplay by the user, the content is modified during gameplay so as to change the expected duration of the gameplay on the fly. This may include a shortening of the expected duration or a lengthening. The parameters to be modified may include one or more of a game intensity, a remaining duration of a game segment, an enemy spawn rate, the location of save areas or checkpoints, a game speed, and a game difficulty.

In some embodiments, the content modification unit 520 is operable to generate a notification for presentation to the user indicating a suitable time to interrupt gameplay in dependence upon game state information. For instance, upon a user reaching a checkpoint or another suitable game state for a user to pause or quit it may be determined whether they are likely to reach a next checkpoint or suitable game state before the expiration of the available time. If it is considered that the user is not likely to reach such a game state, then the user may be presented with a notification indicating this. In some cases, the user may be presented with a percentage chance of reaching the next suitable game state and/or an expected amount of time to reach the next suitable game state (for instance, presented as an amount of time the available time would be expected to be exceeded by). In some embodiments, the processing unit 530 is operable to save the game progress and/or exit the game once this notification has been presented to the user.

The processing unit 530 is operable to present the modified video game content to the user via a display associated with the processing device; this may be a processing device such as the device 100 discussed with reference to FIG. 1. This may be implemented by a games console and television, for instance, or a device with an integrated display such as a mobile phone, tablet computer, or laptop.

The modification process may be performed throughout gameplay, rather than at a single time. That is to say that there may be multiple modifications throughout the user's gameplay rather than a single modification, and that both the available time and location of suitable break points within the game can be monitored in a continuous manner (or using a plurality of discrete monitoring events). This can be advantageous for a number of reasons, such as by allowing a responsive modification in the face of changing conditions (such as varying time taken by the user and varying available time) and by allowing a succession of smaller modifications which can feel more immersive and provide more control over the location of a suitable break point relative to the end of the available time.

Further features of the modification are discussed with reference to FIG. 3 of the specification; these may be considered to be compatible with the arrangement discussed with respect to FIG. 5 and as such the features of these discussions may be combined freely.

The arrangement of FIG. 5 is an example of a processor (for example, a GPU and/or CPU located in a games console or any other computing device) that is operable to modify video game content in dependence upon the time available to a user of a processing device, and in particular is operable to: receive inputs from one or more devices indicative of an expected duration of a function being performed by a respective device; determine, in dependence upon received inputs, an amount of time available to a user before the completion of the function of respective ones of the one or more devices; modify video game content in dependence upon the determined amount of time; and present the modified video game content to the user via a display associated with the processing device.

FIG. 6 schematically illustrates a method for selecting content for a user in dependence upon a received input. This method may be implemented in accordance with the discussion provided with reference to FIG. 4, for instance. A step 600 comprises receiving inputs from one or more devices indicative of an expected duration of a function being performed by a respective device. A step 610 comprises determining, in dependence upon received inputs, an amount of time available to a user before the completion of the function of respective ones of the one or more devices. A step 620 comprises selecting video game content in dependence upon the determined amount of time. A step 630 comprises presenting the selected video game content to the user via a display associated with the processing device.

Figure 7:
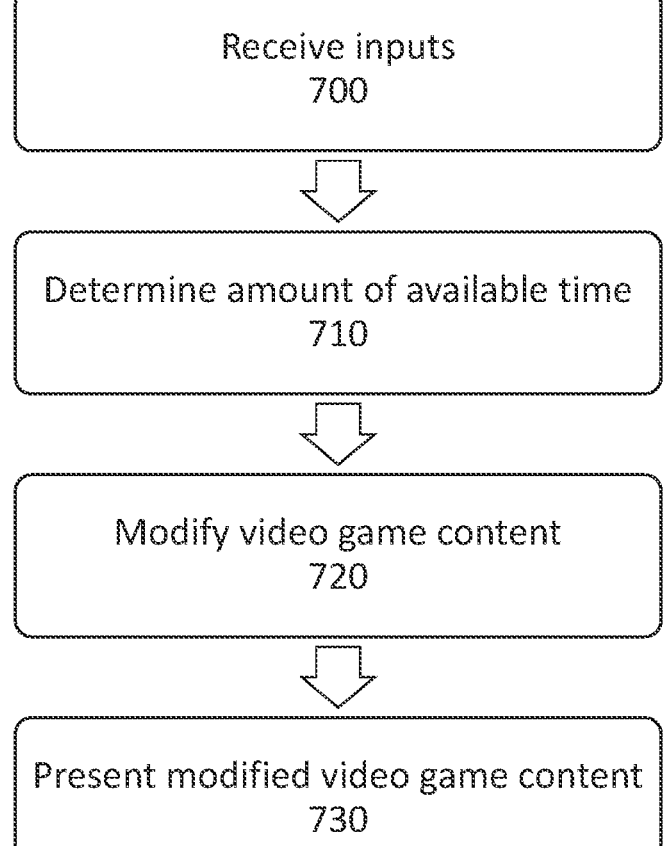
FIG. 7 schematically illustrates a method for modifying content for a user in dependence upon a received input.

FIG. 7 schematically illustrates a method for modifying content for a user in dependence upon a received input. This method may be implemented in accordance with the discussion provided with reference to FIG. 5, for instance. A step 700 comprises receiving inputs from one or more devices indicative of an expected duration of a function being performed by a respective device. A step 710 comprises determining, in dependence upon received inputs, an amount of time available to a user before the completion of the function of respective ones of the one or more devices. A step 720 comprises modifying video game content in dependence upon the determined amount of time. As noted above, this step may be performed multiple times to provide a plurality of modifications at different times—in accordance with this, an estimation of the amount of available time may also be performed multiple times to generate revised values for the amount of time available to a user. A step 730 comprises presenting the modified video game content to the user via a display associated with the processing device.

While described separately, it is considered that the methods of FIG. 6 and FIG. 7 (and the respective arrangements of FIGS. 4 and 5) may be implemented in combination. For instance, in some embodiments content may be selected in dependence upon the available time and then further modified in dependence upon the available time during gameplay. This may be particularly advantageous in cases in which the available time can change from an initial estimate, or in cases in which the selected game (or game experience) has a duration which is highly variable (either through a lack of predictability, user pausing gameplay, or poor/exceptional player performance). An example of such a method includes the following steps: A step comprising receiving inputs from one or more devices indicative of an expected duration of a function being performed by a respective device. A step comprising determining, in dependence upon received inputs, an amount of time available to a user before the completion of the function of respective ones of the one or more devices. A step comprising selecting video game content in dependence upon the determined amount of time. A step comprising presenting the selected video game content to the user via a display associated with the processing device. One or more steps comprising modifying video game content in dependence upon the determined amount of time. A step comprising presenting the modified video game content to the user via a display associated with the processing device. As noted above, this is an exemplary method and other methods comprising the selection and modification steps may be implemented as appropriate for a given embodiment.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A content modification system operable to modify video game content in dependence upon the time available to a user of a processing device, the system comprising: an input receiving unit operable to receive inputs from one or more devices indicative of an expected duration of a function being performed by a respective device; an available time determination unit operable to determine, in dependence upon received inputs, an amount of time available to a user before the completion of the function of respective ones of the one or more devices; a content modification unit operable to modify video game content in dependence upon the determined amount of time; and a processing unit operable to present the modified video game content to the user via a display associated with the processing device.

2. A system according to clause 1, wherein the content modification unit is operable to select one or more parameters for initiating a segment of a game.

3. A system according to clause 2, wherein the segment is a game level, a sports match, or a race.

4. A system according to any preceding clause, wherein the content modification unit is operable to modify one or more parameters of video game content during gameplay by the user.

5. A system according to clause 3, wherein the parameters include one or more of a game intensity, a remaining duration of a game segment, an enemy spawn rate, the location of save areas or checkpoints, a game speed, and a game difficulty.

6. A system according to any preceding clause, wherein the available time determination unit is operable to determine whether the user is expected to pause the game or exit the game.

7. A system according to any preceding clause, the content modification unit is operable to generate a notification for presentation to the user indicating a suitable time to interrupt gameplay in dependence upon game state information.

8. A system according to clause 7, wherein the processing unit is operable to save the game progress and/or exit the game once the notification has been presented to the user.

9. A system according to any preceding clause, wherein the processing device is a games console, tablet computer, or mobile phone.

10. A system according to any preceding clause, wherein the other devices include one or more household appliances and/or other Internet of Things, IoT, devices.

11. A system according to any preceding clause, wherein the input receiving device is operable to receive information from a routing device that is configured to act as an intermediate device between at least one of the one or more devices and the processing device.

12. A system according to clause 12, wherein the routing device is operable to process information received from devices to identify timing and/or function information.

13. A method for modifying video game content in dependence upon the time available to a user of a processing device, the method comprising: receiving inputs from one or more devices indicative of an expected duration of a function being performed by a respective device; determining, in dependence upon received inputs, an amount of time available to a user before the completion of the function of respective ones of the one or more devices; modifying video game content in dependence upon the determined amount of time; and presenting the modified video game content to the user via a display associated with the processing device.

14. Computer software which, when executed by a computer, causes the computer to carry out the method of clause 13.

15. A non-transitory machine-readable storage medium which stores computer software according to clause 14.

The invention claimed is:

1. A system comprising:
a processing device comprising:
an input receiver configured to receive an input from a device of one or more devices, wherein the input is indicative of an expected duration of a current function being performed by the device; and
one or more processors configured to:
provide a content via a display associated with the processing device:
receive the input while providing the content:
determine, upon the input, an amount of time before the completion of the current function of the device;
modify the content upon the determined amount of time; and
present the modified content via the display.

2. The system of claim 1, wherein the content is a content of a video game, and
wherein the one or more processors are configured to select one or more parameters for initiating a segment of a game.

3. The system of claim 2, wherein the segment is a game level, a sports match, or a race.

4. The system of claim 1,
wherein the one or more processors are configured to modify one or more parameters of the content while being presented.

5. The system of claim 4, wherein the parameters include one or more of a game intensity, a remaining duration of a game segment, an enemy spawn rate, the location of save areas or checkpoints, a game speed, and a game difficulty.

6. The system of claim 1, wherein the one or more processors are configured to determine whether the content is expected to be paused or closed.

7. The system of claim 1, the one or more processors are configured to generate a notification for presentation indicating a suitable time to interrupt gameplay in dependence upon game state information.

8. The system of claim 7, wherein one or more processors are configured to save the game progress and/or exit the game once the notification has been presented.

9. The system of claim 1, wherein the processing device comprises a games console, tablet computer, or mobile phone.

10. The system of claim 1, wherein the one or more devices include one or more household appliances and/or other Internet of Things, IoT, devices.

11. The system of claim 1, wherein the input receiver is configured to receive information from a routing device that is configured to act as an intermediate device between at least one of the one or more devices and the processing device.

12. The system of claim 11, wherein the routing device is configured to process information received from at least one of the one or more devices to identify timing and/or function information.

13. A method comprising:

providing a content via a display associated with a processing device;

receiving an input from a device of one or more devices indicative of an expected duration of a current function being performed by the device;

determining, upon the input, an amount of time before the completion of the current function of the device;

modifying the content upon the determined amount of time by the processing device; and presenting the modified content via the display.

14. A non-transitory machine-readable storage medium which stores computer software which, when executed by a processing device, causes the processing device to perform a method, comprising:

providing a content via a display associated with the processing device;

receiving an input from a device of one or more devices indicative of an expected duration of a current function being performed by a respective device;

determining, upon the input, an amount of before the completion of the current function of the device;

modifying the content upon the determined amount of time by the processing device; and presenting the modified content via the display.

15. The system of claim 10, wherein the one or more household appliances includes at least one of an oven, a microwave, a kettle, a washing machine, or a tumble drier.

16. The method of claim 13, further comprising determining whether the content is expected to be paused or closed.

17. The method of claim 13, further comprising processing information received from the device to identify timing and/or function information by a routing device.

18. The non-transitory machine-readable storage medium of claim 14, wherein the method further comprises determining whether the content is expected to be paused or closed.

19. The non-transitory machine-readable storage medium of claim 14, wherein the method further comprises processing information received from the device to identify timing and/or function information by a routing device.

20. The non-transitory machine-readable storage medium of claim 14, wherein the one or more devices include at least one of an oven, a microwave, a kettle, a washing machine, or a tumble drier.

\* \* \* \* \*